(No Model.)
E. A. LONG.
PULLEY.
No. 479,221. Patented July 19, 1892.
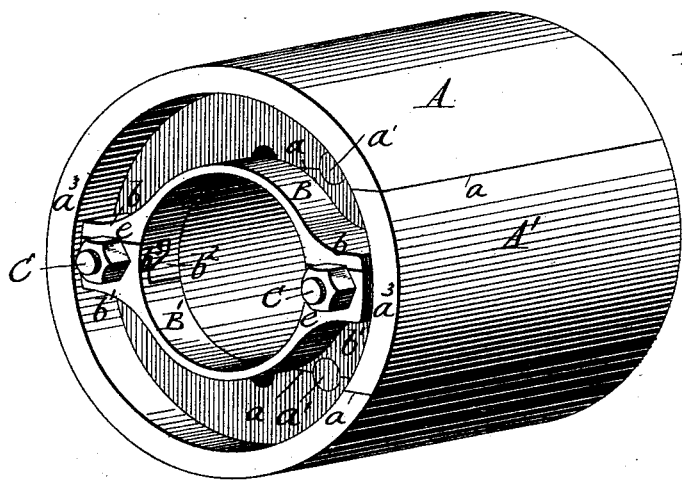
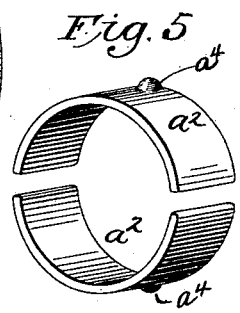
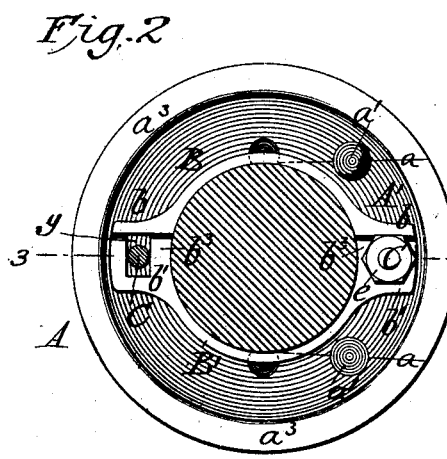
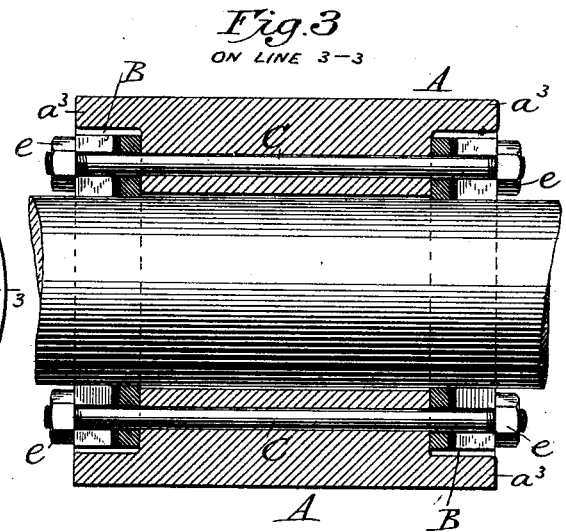
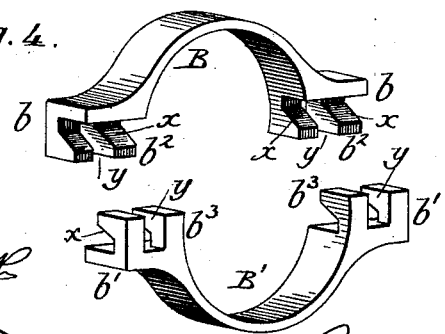
Witnesses
Inventor
Eber A. Long
by his attorneys

UNITED STATES PATENT OFFICE.

EBER A. LONG, OF SOUTH BEND, INDIANA, ASSIGNOR TO THE SOUTH BEND PULLEY COMPANY, OF SAME PLACE.

PULLEY.

SPECIFICATION forming part of Letters Patent No. 479,221, dated July 19, 1892.

Application filed April 9, 1892. Serial No. 428,472. (No model.)

*To all whom it may concern:*

Be it known that I, EBER A. LONG, a citizen of the United States, residing at South Bend, in the county of St. Joseph and State of Indiana, have invented certain new and useful Improvements in Pulleys, of which the following is a specification.

The object of my invention is to provide pulleys with improved devices for securing them to shafting. While my improvements are applicable to band-pulleys generally, they especially relate to split pulleys or those in which the rim or body is divided into sections and removable laterally from the shaft.

In carrying out my invention I form the rim or body of the pulley in sections, and at each end of the pulley I provide clamping devices consisting of pairs of half-rings or clamp-sections with interlocking arms, which are drawn together by bolts extending through them and through the pulley longitudinally with its axis. The clamping devices or half-rings are separable from the pulley and may be loosened or tightened, removed from the shaft, or replaced thereon without loosening the pulley-sections; but these may be readily loosened and separated to remove the pulley laterally from the shaft when desired.

In the accompanying drawings I have shown my improvements embodied in a small split wooden pulley without spokes; but I wish it understood that, although I have only shown one way of embodying my invention and herein describe specifically only one way, I do not wish to limit myself to the special construction shown or described, but intend that my claims at the end of the specification shall determine the scope of my invention.

Figure 1 is a perspective view of a split pulley embodying my improvements. Fig. 2 is an end elevation thereof with the shaft in section and the clamping devices partly broken away. Fig. 3 is a longitudinal horizontal central section on the line 3 3 of Fig. 2. Fig. 4 is a detail view in perspective of a pair of the clamping devices, and Fig. 5 is a perspective view of a bushing that may be employed.

The rim or body of the pulley is shown as formed in two parts or sections A A', jointed at $a$ and secured by pins or pegs $a'$. The body is centrally bored and at each end is formed with an annular flange $a^3$, surrounding the clamping devices, which connect the pulley to the shaft. I so construct and arrange the clamping devices that they are separable from the pulley and may be tightened or loosened, removed from the shaft, or replaced thereon without radial strain on the pulley rim or body. I have shown the best way known to me of accomplishing this result.

The clamp at each end of the pulley consists of a pair of half-rings or clamp-sections B B', having outwardly-projecting arms $b\ b'$, formed with interlocking flanges $b^2\ b^3$, having inclined abutting surfaces $x$. When the flanges interlock, as shown in Fig. 1, the half-rings or clamp-sections B B' surround the shaft and fit it closely. Bolts C extend longitudinally through the pulley-sections parallel with the shaft and also through elongated openings $y$ in the arms of the clamps. Both ends of the bolts are preferably screw-threaded and provided with tightening-nuts $e$. The construction and arrangement are such, as will be clear from an inspection of the drawings, that by tightening the nuts the clamp-sections will be drawn toward the ends of the pulley and at the same time are made to move toward the shaft and to clamp themselves on it, the inclined abutting surfaces of the interlocking flanges facilitating this movement.

It will be observed that the clamping-sections are secured to the pulley solely by the bolts C and that when the nuts are tightened there is no radial strain, in fact no detrimental strain of any kind on the pulley; but the clamps are firmly and securely applied to the shaft, and there is no danger of slipping. It will also be observed that the construction is such that the pulley with its clamping devices may be applied to shafts of different sizes, the inclined abutting surfaces of the flanges $b^2\ b^3$ permitting of this adjustment.

When the pulley is applied to a shaft of a diameter less than that of the standard bore, bushings $a^2$, made in sections, as shown in Fig. 5, may be interposed between the clamp-sections and the shaft. The bushing-sections are shown as formed with lugs $a^4$, adapted to fit in recesses on the ends of the pulley. The kind of bushing employed and the manner of connecting it with the body of the pulley are not, however, important.

I claim as my invention—

1. The combination of the pulley proper and clamping devices comprising clamp-sections movable axially toward and from the pulley and radially relatively thereto and having interlocking flanges and bolts longitudinal to the axis of the pulley for uniting the clamp-sections and applying them to the shaft.

2. The combination of the pulley proper and clamping devices comprising clamp-sections movable axially toward and from the pulley and radially relatively thereto and having flanges formed with inclined abutting surfaces and bolts longitudinal to the axis of the pulley for uniting the clamp-sections and applying them to the shaft.

3. The combination of the pulley and clamping devices comprising separable clamp-sections movable radially independently of the pulley proper and having arms formed with interlocking flanges with inclined abutting surfaces and bolts longitudinal to the axis of the pulley, which constitute the sole means for connecting the clamp-sections to the pulley and which also unite the clamp-sections and apply them to the shaft.

4. The combination of the pulley and clamping devices at each end thereof, comprising a pair of half-rings movable radially relatively to the pulley and formed with arms having interlocking flanges and longitudinally-arranged bolts for applying the ring-sections to the shaft and for connecting them to the pulley.

5. The combination of the pulley and clamping devices, comprising clamp-sections movable radially relatively to the pulley and longitudinally-arranged bolts passing through the body of the pulley and through the clamp-sections for uniting them and moving the clamp-sections radially.

6. The combination, with the pulley formed with recesses at each end, of a pair of clamp-sections or half-rings within each of said recesses and movable radially relatively to the pulley, and bolts extending longitudinally through the body of the pulley and through the clamp-sections and having adjusting-nuts for firmly uniting the clamp-sections to the pulley and for moving them radially relatively to the pulley.

In testimony whereof I have hereunto subscribed my name.

EBER A. LONG.

Witnesses:
C. H. TAVERNIER,
HARRY STULL.